United States Patent
Murphy, Jr. et al.

(10) Patent No.: US 7,941,507 B1
(45) Date of Patent: May 10, 2011

(54) HIGH-AVAILABILITY NETWORK APPLIANCES AND METHODS

(75) Inventors: Kevin J. Murphy, Jr., Marlborough, MA (US); John Amaral, Boxborough, MA (US)

(73) Assignee: Network Engines, Inc., Canton, MA (US)

( * ) Notice: Subject to any disclaimer, the term of this patent is extended or adjusted under 35 U.S.C. 154(b) by 889 days.

(21) Appl. No.: 11/337,165

(22) Filed: Jan. 20, 2006

Related U.S. Application Data

(60) Provisional application No. 60/645,851, filed on Jan. 21, 2005.

(51) Int. Cl.
*G06F 15/177* (2006.01)
*G06F 15/173* (2006.01)
(52) U.S. Cl. .................. 709/220; 709/223; 709/224
(58) Field of Classification Search .......... 709/223–224, 709/226, 220
See application file for complete search history.

(56) References Cited

U.S. PATENT DOCUMENTS

| | | | |
|---|---|---|---|
| 6,195,760 B1 * | 2/2001 | Chung et al. ............... | 714/4 |
| 7,281,031 B1 * | 10/2007 | Wang et al. ............... | 709/213 |
| 7,334,014 B2 * | 2/2008 | Moser et al. ............... | 709/202 |
| 7,373,399 B2 * | 5/2008 | Steele et al. ............... | 709/223 |
| 7,409,577 B2 * | 8/2008 | Wing et al. ............... | 714/4 |
| 2003/0033346 A1 * | 2/2003 | Carlson et al. ............... | 709/104 |
| 2006/0155837 A1 * | 7/2006 | Kobayashi et al. ........... | 709/223 |

\* cited by examiner

*Primary Examiner* — Hussein A Elchanti
(74) *Attorney, Agent, or Firm* — Nutter McClennen & Fish LLP; David J. Powsner; Christopher J. Stow

(57) ABSTRACT

The invention provides apparatus and systems for high availability execution of applications executing on one or more digital data processor platforms. For example, a system according to one aspect of the invention includes a first set digital data processors, each of which executes one or more applications. These are referred to as "primaries" or "primary applications." A second set of digital data processors execute virtual machines, each of which, in turn, executes an image of a corresponding primary application. These are referred to as "imaged" or "imaged applications." Each of the first and second sets may have one or more digital data processors. Agent functionality residing on and/or coupled to the digital data processors in the first and second sets maintains state/configuration information for each imaged application. That information, which reflects current or substantially current state of the corresponding primary application, is of such a nature as to permit the imaged application to take over applications processing, e.g., in the event the primary application fails or otherwise becomes unavailable. The agent functionality, according to related aspects of the invention, can monitor the primary applications (and/or the first set of digital data processors) and effect such a take over by a specific imaged application.

17 Claims, 4 Drawing Sheets

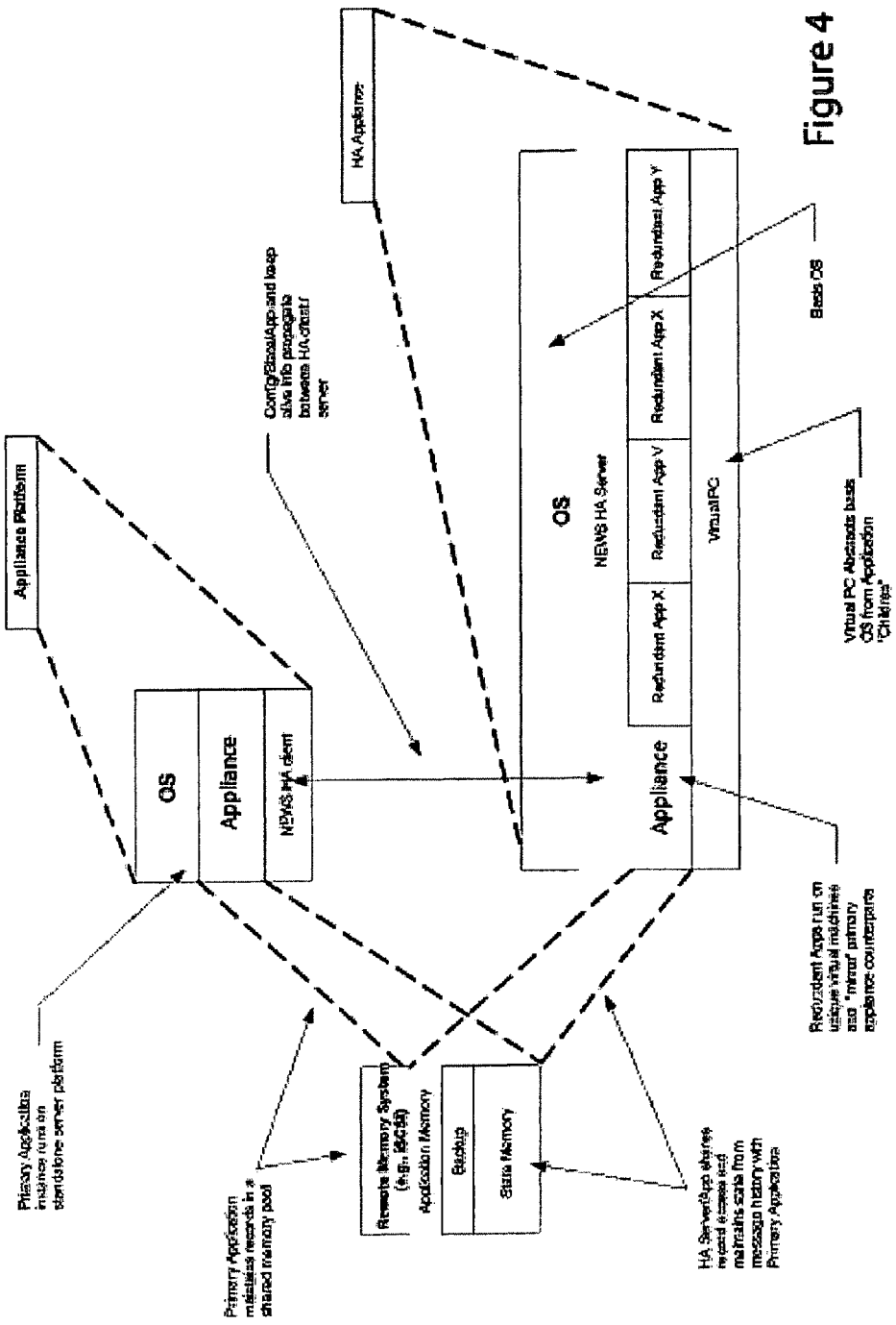

HIGH-AVAILABILITY NETWORK APPLIANCES AND METHODS

This application claims the benefit of priority to U.S. Provisional Patent Application Ser. No. 60/645,851, filed Jan. 21, 2005, entitled "HIGH-AVAILABILITY NETWORK APPLIANCES AND METHODS," the teachings of which are incorporated herein by reference.

BACKGROUND OF THE INVENTION

The invention pertains to digital data processing and, more particularly, to methods and apparatus for maintaining the high-availability of software processes, e.g., as a holistic system comprising an operating system (OS) and applications—independent of the hardware. The invention has application, by way of non-limiting example, in client-server and other network environments, where it can used (by way of non-limiting example) in maintaining the high-availability of applications executing on server appliances.

High-availability is one of the "holy grails" of enterprise computing. To date, solutions provided by the art have been largely limited to hardware redundancy. Thus, for example, devices that are used with mission-critical data are often duplicated on a per device basis. This is most commonly seen in storage devices, where it is becoming increasingly common to incorporate redundant disk drives in a computer—or, more commonly, on a network—to mirror each bit of data stored in a primary drive on its secondary (or shadow) drive. Other examples of hardware high-availability solutions include the duplication of central processing units and other lower-level computer components. By operating one or more components as shadow(s) of a primary component and by continuously monitoring all components, is often possible to detect and negate erroneous operation of the primary without interruption of service.

A problem with the prior art solutions is cost. Though sometimes justified in mission-critical applications, duplication of computer devices or the underlying components rapidly drives up the cost of any computer system. In many enterprise applications, the level of criticality does not justify those costs.

There is, accordingly, a need for lower cost digital data processing solutions that provide high availability. Such is an object of invention. More broadly, an object invention is to provide improved systems, methods and apparatus for digital data processing. A further object, in addition to providing such systems, methods and apparatus as facilitate the provision of high availability at lower cost, is to provide such solutions as provide redundancy at the application, program and/or process execution level—not merely the hardware level.

A further such object is to provide such methods and apparatus as are amenable to use in networking environments, as well as non-networking environments. A still further object invention is to provide such methods and apparatus as are amenable to use with vendor application-level (and other) solutions.

SUMMARY OF THE INVENTION

The aforementioned among the objects attained by the invention, which provides methods, apparatus and systems for high availability execution of applications, other programs and/or processes executing on one or more digital data processor platforms.

Such a system includes, according to one aspect of the invention, a first set digital data processors, each of which executes one or more applications and one or more operating systems. These are referred to as "primaries," "primary systems," or "primary applications" in the discussion that follows. Though it is contemplated that these will typically be enterprise-level applications, they can be user applications, operating system tools, or other software programs and/or processes, as well.

A second set of digital data processors that have the ability to execute one or more virtual machines each of which, in turn, executes an imaged copy of a corresponding primary application system. Each of the first and second sets may have one or more digital data processors. However, according to one aspect of the invention, the first set comprises plurality of digital data processors (each executing one or more respective primary applications) and the second set has a single digital data processor (with a corresponding plurality of virtual machines executing corresponding imaged applications of all of the primary systems).

Those skilled in the art will appreciate that an imaged copy is an executable copy of a respective application system. Such images are sometimes referred to as "bit copies" or "ghosts" (named after the Symantec family of products of that name), though as used herein the term is not necessarily so limited. Rather, the term refers to a bit-by-bit or other suitable executable copy of a hard disk (source) or portion thereof. In the illustrated embodiment, that bit-by-bit copy is of the entire hard disk, i.e., the fully installed operating system and any application(s) on that disk—though, in other embodiments a subset of the entire hard disk may be copied. Once an imaged application is created, the substituent components of the original application system can be placed on the same type of hardware as the original system or a suitable equivalent hardware platform capable of executing the imaged application—or, as here, a virtual machine replicating the original system or such equivalent platform. At least one digital data processor in the second set executes two such virtual machines and, therefore, two such imaged applications.

Those skilled in the art will further appreciate that the term "virtual machines" refers to logically independent systems, each of which comprises its own operating system and application software, and one or more of which are capable of simultaneously executing on and sharing physical resources of a given physical digital data processor. These virtual machines can execute under virtualization software of the type available, by way of non-limiting example, from Microsoft (Virtual PC 2004 and Virtual Server 2005) and EMC (VMWare), among others, and/or virtualization hardware—none of which are requisites of the invention—executing on each such physical digital data processor. This permits the operating system instantiation (and, therefore, the application software) associated with each of those virtual machines to execute as if it were the only such operating system on that physical device. Typically, this is accomplished—though, again, not a requisite of the invention—by a hardware abstraction layer (HAL) which allows the virtual machines to physically share hardware resources while remaining logically isolated and independent.

Agent functionality residing on and/or coupled to the digital data processors in the first and second sets maintains state/configuration information for each imaged application. That information, which reflects the current or substantially current state of the corresponding primary application, is of such a nature as to permit the respective imaged application to take over applications processing, e.g., in the event the corresponding primary application becomes unavailable, e.g., on account of failure, upgrade, and so forth—whether by the application itself and/or the application server on which it executes. The agent functionality, according to related aspects of the invention, can monitor the primary applications (and/or the first set of digital data processors) and effect such a take over by a specific imaged application if the corresponding primary application becomes unavailable.

According to related aspects of the invention, the virtual machines execute the imaged applications through preliminarily phases, e.g., boot-up. Thereafter, each of the imaged applications is maintained in "stasis" or other temporary stable state pending the corresponding primary failing or otherwise becoming unavailable. In addition, the imaged applications can be brought out of stasis if and as necessary to process, integrate or otherwise accommodate updates to state/configuration information from the corresponding primary.

According to further related aspects of the invention, when an image is unsuspended (e.g., on account of failure or other unavailability of the primary), increased resources are dedicated to it by the digital data processor on which its associated virtual machine is executing. This may be effected by action of the agent functionality and/or the virtual machine itself. Those increased resources can be sufficient for the virtual machine to execute the image so that it provides the same throughput as did the corresponding primary prior to its becoming unavailable. Alternatively, lesser or greater resources can be dedicated to the virtual machine, depending on the desired degree of throughput, functionality and/or responsiveness.

According to still further related aspects of the invention, multiple imaged applications can be unsuspended, e.g., in the event of failure or other unavailability of multiple corresponding primaries.

In still other aspects of the invention, the agent functionality maintains for the imaged applications state/configuration information that is current as of the last complete transaction processed by the corresponding primary applications. Thus, when an imaged application is unsuspended, it can take over processing from its corresponding primary as of last complete transaction handled by it.

The agent functionality, according to other aspects of the invention, maintains state/configuration information at other degrees of currency. Thus, for example, that information can be current to the latest user keystroke received by the primary or input/output operation performed by it. Alternatively, by way of further example, it can be current only to the latest boot-up of the primary.

Still other aspects of the invention provide systems as described above in which imaged applications are coupled (via the underlying digital data processors) to storage and/or other peripheral devices to which the corresponding primary applications are coupled (again, via their respective underlying digital data processors). As a consequence, by way of example, when the imaged application is unsuspended to take over processing for its primary, the imaged application can access transaction and/or other data previously available to and/or stored by the primary.

In still other aspects of the invention, the agent functionality detects start-up of a primary application (e.g., on account of its loading and/or execution) and causes the corresponding imaged application to be loaded into a virtual machine. In related applications, that imaged application can be stored (prior to its loading into the virtual machine) on the applications server that executes the primary or on some other storage device. The image can be stored simply as a static file representing a bootable image, consuming no CPU or memory—only the disk space required for storage.

Still other aspects of the invention provide methods for operating a system of the type described above.

Yet still other aspects of the invention provide digital data processors (and methods of operation thereof) for executing primary applications and/or for executing virtual machines that host the imaged applications, all as described above.

BRIEF DESCRIPTION OF THE DRAWINGS

A more complete understanding of the invention may be attained by reference to the drawings, in which:

FIG. 4 depicts the architecture and interrelationships between the application servers and the HA appliance, and provides further notes regarding same.

DETAILED DESCRIPTION OF THE ILLUSTRATED EMBODIMENT

Figure 1:
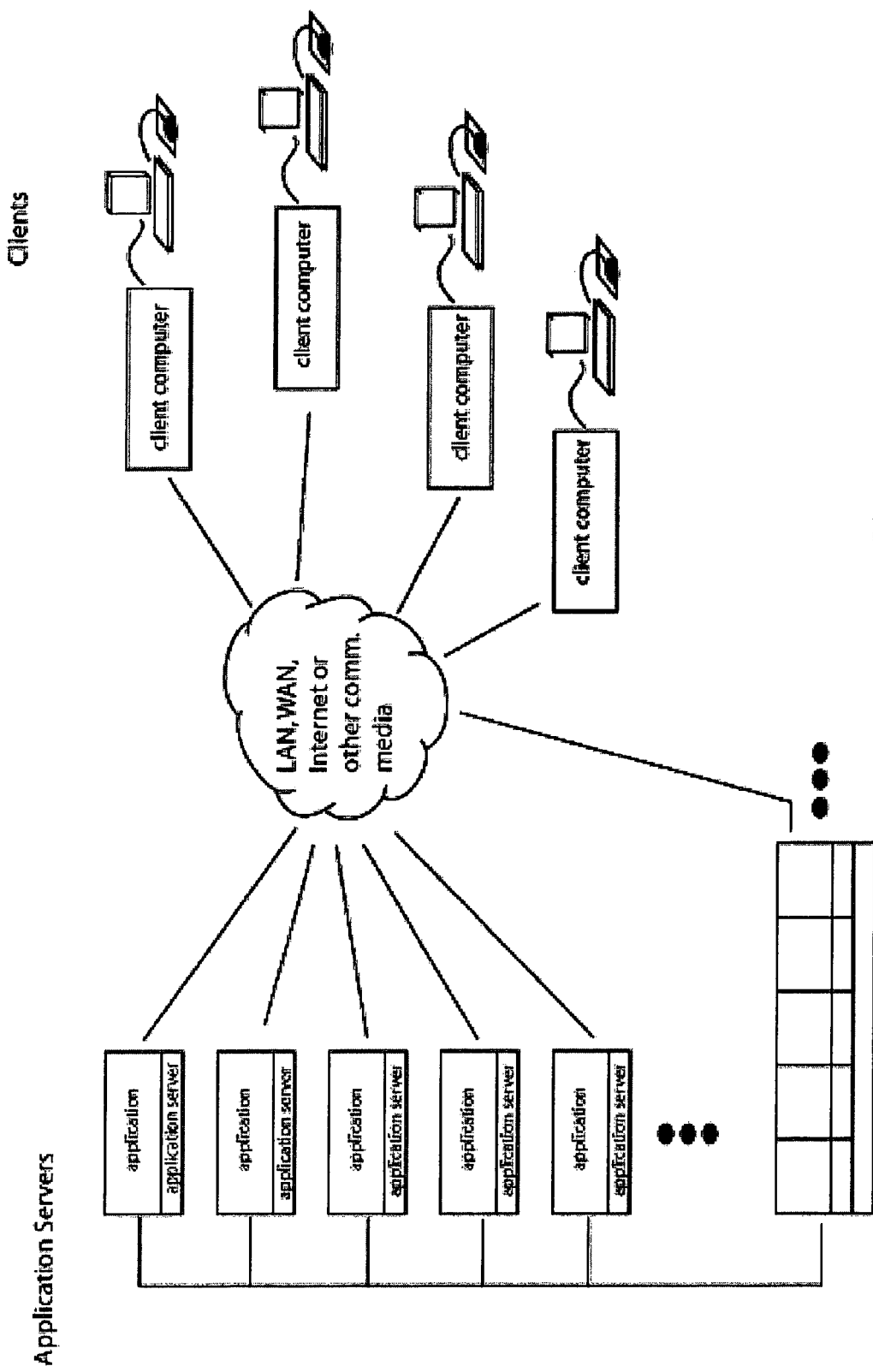
FIG. 1 depicts a system according to one practice of the invention.

FIG. 1 depicts a system according to one practice of the invention. This includes a one or more client digital data processors (here, labelled "client computer") and one or more application servers coupled by a communications medium (here, depicted as a cloud), e.g., a LAN, WAN, Internet or otherwise. The client computers, which are not necessary to practice of the invention, represent embedded processors, PDAs, PCs, workstations, mainframes, or other digital data processing apparatus with which the applications servers may be in communication and/or on behalf of which the applications servers may execute applications, programs and/or processes.

The application servers can comprise embedded processors, PDAs, PCs, workstations, mainframes, or other digital data processing apparatus capable of executing applications, programs and/or processes. However, in the illustrated embodiment, these are rack-mounted or other digital data processors configured for executing dedicated applications on behalf of the clients and/or a business or other enterprise (not shown), as well as for executing agent functionality as described below. Non-limiting examples of such applications include accounting packages, web servers, database management systems, to name just a few. Five application servers are shown in the drawing, though more or less such devices may be used in actual practice of the invention.

The illustrated system further incudes a high-availability appliance (hereinafter, "HA appliance") that is coupled to the application servers and to the clients computers. Coupling to the clients is provided, in the illustrated embodiment, by the same medium (e.g., LAN, WAN or Internet) described above and graphically depicted by the cloud. Though the same such coupling may be provided between the application servers and the HA appliance, in the illustrated embodiment, a separate communications medium is provided, as shown by the dark line interconnecting those elements at left in the drawing. This may be a dedicated (or non-dedicated) bus, network or otherwise, e.g., of the type used between servers and/or backup devices in an enterprise digital data processing center.

The HA appliance comprises any digital data processing apparatus capable of executing virtual machines, imaged applications, and agent functionality as described below. This may comprise embedded processors, PDAs, PCs, workstations, mainframes, or other digital data processing apparatus sufficient to provide the necessary processing resources, though, in the illustrated embodiment it comprises a rack-mounted or other digital data processor of the same general class as the application servers themselves. Only one HA appliance is shown in the drawings; however, in practice, multiple such devices may be used; however, those skilled in the art will recognize as a key advantage of the invention that a single HA appliance can provide redundancy for multiple systems—including the ability to have more than one system running concurrently within the single hardware platform of the HA appliance.

Figure 2:
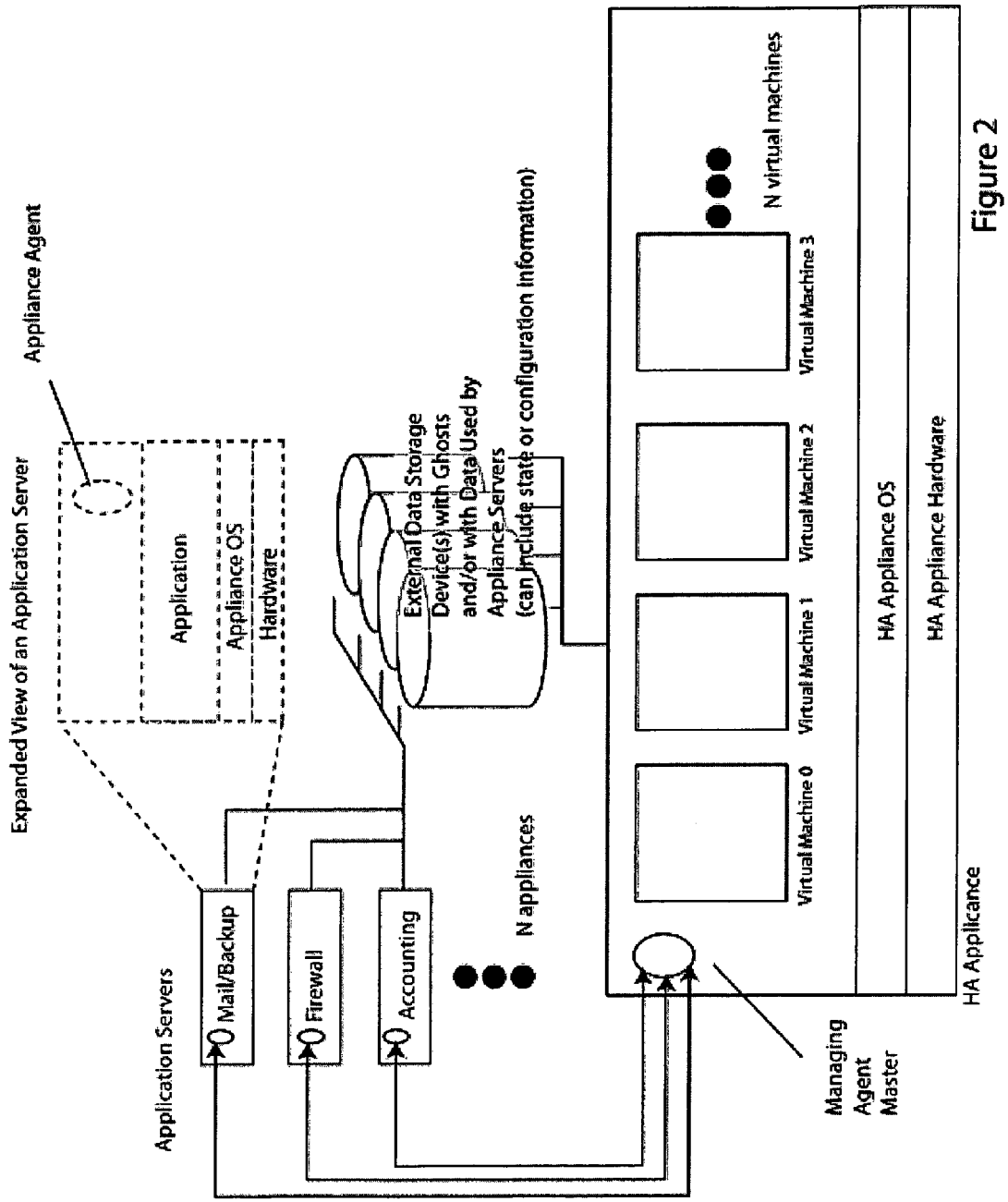
FIG. 2 depicts in greater detail the structure, interaction and operation of the appliance servers and HA appliance according to one practice of the invention.

FIG. 2 depicts in greater detail the structure, interaction and operation of the appliance servers and HA appliance according to one practice of the invention.

As noted, illustrated application servers execute applications on behalf of the clients and/or a business or other enterprise. In other embodiments, however, those servers may execute applications, or other computer programs and/or software processes on behalf of other persons, things or entities. For sake of simplicity and without loss of generality, such applications, programs and/or processes are hereinafter referred to as "applications," "primary applications," and/or "primaries." Three servers are shown in the drawing: one, dedicated to e-mail and backup primaries; one, dedicated to an enterprise firewall primary; and, one, dedicated to serving an enterprise accounting primary.

In the illustrated embodiment, each of the application servers comprises computer hardware, an operating system (OS) and the one or more applications that are executed on that server. This is indicated by the dashed-line expanded view of the mail/backup client shown (by way of example) in the drawing. The application server comprises hardware conventional in and native to the embedded processor, PDA, PC, workstation, mainframe, or other digital data processing apparatus on which the appliance server is embodied. The application server OS comprises Windows, Unix, Linux or any other operating system conventional in and native to, or installed on, the application server suitable for executing the dedicated application(s) and otherwise suitable for operating in accord with the teachings hereof. The primaries executing on the application servers, as noted above, comprise conventional applications, programs and/or processes of the type used in an enterprise or otherwise. These are adopted, if and as necessary, to interface with the appliance agents discussed below.

In addition to the OS, primary applications and other software native to, or installed on, the application servers, each application server also executes an appliance agent. The agents are indicated as ovals in the drawing. These are appliance agents, in the case of the ovals shown in appliance servers, and master agents, in the case of the oval shown in an HA appliance. In the illustrated embodiment, this comprises software installed and executed on the application server independent of, though operating in conjunction with, the primary (or primaries) on that server. However, in other embodiments, the functionality of the appliance agent may be partially or fully incorporated directly into the primaries. Moreover, the appliance agents may be implemented partially or fully in hardware (e.g., by way of dedicated processors, gate arrays, and so forth).

The HA appliance provides for dynamic N+1 application redundancy, whereby a "rack" of virtual PCs (i.e., imaged application executing in virtual machines) protects the primary application servers from down-time due to failure, upgrade, application crashes, hardware failure, server upgrade, storage growth, and so forth.

To this end, the HA appliance executes a plurality of virtual machines: in the illustrated embodiment, one for each appliance server (or, where the appliance servers execute multiple primaries for which high-availability is desired, one for each such primary). Each of these virtual machines, in turn, executes an image of a corresponding primary application. These are referred to as "images" or "imaged applications" in the discussion that follows.

The illustrated HA appliance comprises computer hardware, an operating system (OS) and the aforementioned plural virtual machines. The HA appliance comprises hardware that conventional in and native to the embedded processor, PDA, PC, workstation, mainframe, or other digital data processing apparatus on which the HA appliance is embodied. The appliance OS comprises Windows, Unix, Linux or any other operating system conventional in and native to, or installed on, the application server suitable for executing the virtual machines and for operating in accord with the teachings hereof.

The virtual machines executing on the HA appliance comprise virtual machines of conventional design and operation capable of execution on the HA appliance and capable of executing imaged applications of the respective primaries. In the illustrated embodiment, each such imaged application comprises an image of the corresponding primary and the operating system under which it operates on its underlying application server.

In addition to the OS, virtual machines (and the imaged applications executing therein) and other software native to, or installed on the HA appliance, that device also executes a master agent. This denoted, as mentioned above, by an oval in the drawing. Although only one such master agent is shown in the drawing, in some embodiments multiple master agents are utilized, e.g., one corresponding to each appliance agent. In the illustrated embodiment, the master agent comprises software; however, in other embodiments, the functionality of that agent may be partially or fully incorporated directly into the virtual machines and/or imaged applications. Moreover, the master agent may be implemented partially or fully in hardware (e.g., by way of dedicated processors, gate arrays, and so forth).

Together, the master and appliance agents maintain state/configuration information for each imaged application executing on the HA appliance. That information, which reflects current or substantially current state of the corresponding primary application, is of such a nature as to permit the imaged application to take over applications processing, e.g., in the event the primary application fails (e.g., on account of a crash or other loss of service by the digital data processor on which that application is executing). The state information can be managed by the agents locally or remotely for added security and redundancy.

In the illustrated embodiment, this includes all information necessary to enable initialization (or boot-up) of the respective imaged applications, e.g., including identification of necessary data sources, user authorizations, IP addresses, configuration, and other system specific information, communications channels, peripheral devices, and so forth. For transaction-oriented primaries, it also includes inter-transaction state information—which can be routed, e.g., from appliance agent to master agent, as each transaction completes—sufficient to keep the corresponding imaged application up-to-date and able to take over applications processing as of at least the last completed transaction. It can also include intra-transaction data, however, depending on the degree of currency desired or required. For non transaction-oriented applications (as well as transaction-oriented ones), this can include information as of selected snap-shot intervals (e.g., 1 minute, 5-minute, and 10-minute, intervals, and so forth), information current to the latest user keystroke received by the primary or input/output operation performed by it, and so forth.

Normally, i.e., in the absence of fault or unavailability of the application servers and/or primaries, the imaged applications are maintained in "stasis" or other temporary stable state within their respective virtual machines. To this end, each virtual machine loads its respective imaged application and executes that imaged application through preliminarily phases, e.g., boot-up. Necessary configuration and state information for this is provided, for example, by the agents, as noted in the paragraph above. Following initialization, each imaged application is maintained in stasis pending failure of the corresponding primary. Each imaged application can also be brought out of stasis if and as necessary to process, integrate or otherwise accommodate updates to state/configuration information provided by the agents from the corresponding primary.

Load-up of the virtual machines can be performed upon start-up of the corresponding primary or its application server. Such start-up can be detected by the application agent present on that server, which can signal the master agent to instantiate or otherwise ready a corresponding virtual machine. The agent can effect transfer of an image of the primary to the master agent, HA appliance and/or virtual machine, e.g., from a store in the application server and/or from an external storage device of the type shown in the drawing.

In addition transfer state/configuration information as discussed above, illustrated master and/or appliance agents monitor the primary applications (and/or their respective application servers to detect crashes, fault or other states of unavailability in the operation thereof. Upon such detection, the appliance agent executing on the implicated application server can signal the corresponding primary and/or server to go off-line. That agent can correspondingly signal the master agent to effect take-over by the corresponding imaged application. Alternatively, or in addition, the master agent can periodically poll the application agents to ensure that there respective primaries and/or servers are running and, in the absence of acceptable reply, the master agent can assume that a fault or other condition of unavailability has occurred and, likewise, effect take-over by the corresponding imaged application.

When an imaged application is unsuspended (e.g., on account of failure or other condition of unavailability of the primary), the virtual machine in which that imaged application executes and/or master agent signals the HA appliance to increase resources dedicated to that virtual machine. At the same time, resources made available to the other virtual machines can be reduced, eliminated or maintained at the prior levels. Increased resources to the unsuspended imaged application are preferably sufficient for the virtual machine to execute the imaged application so that it provides the same throughput as did the corresponding primary prior to its becoming unavailable. Alternatively, lesser or greater resources can be dedicated to the virtual machine, depending on the desired degree of throughput, functionality and/or responsiveness. Where necessary, e.g., in the event multiple primaries become unavailable, multiple imaged applications can be unsuspended.

Once unsuspended with sufficient resources, the imaged application(s) takes over processing for its respective primary. This includes responding to users and other communications (human- or machine-originated), accessing storage and/or other peripheral devices, opening and completing transactions, etc., all in the manner otherwise performed by the primary. To this end, the imaged applications can be coupled to data storage devices (as shown), peripherals, communications channels, and so forth, in the same manner as the corresponding primary.

Figure 3:
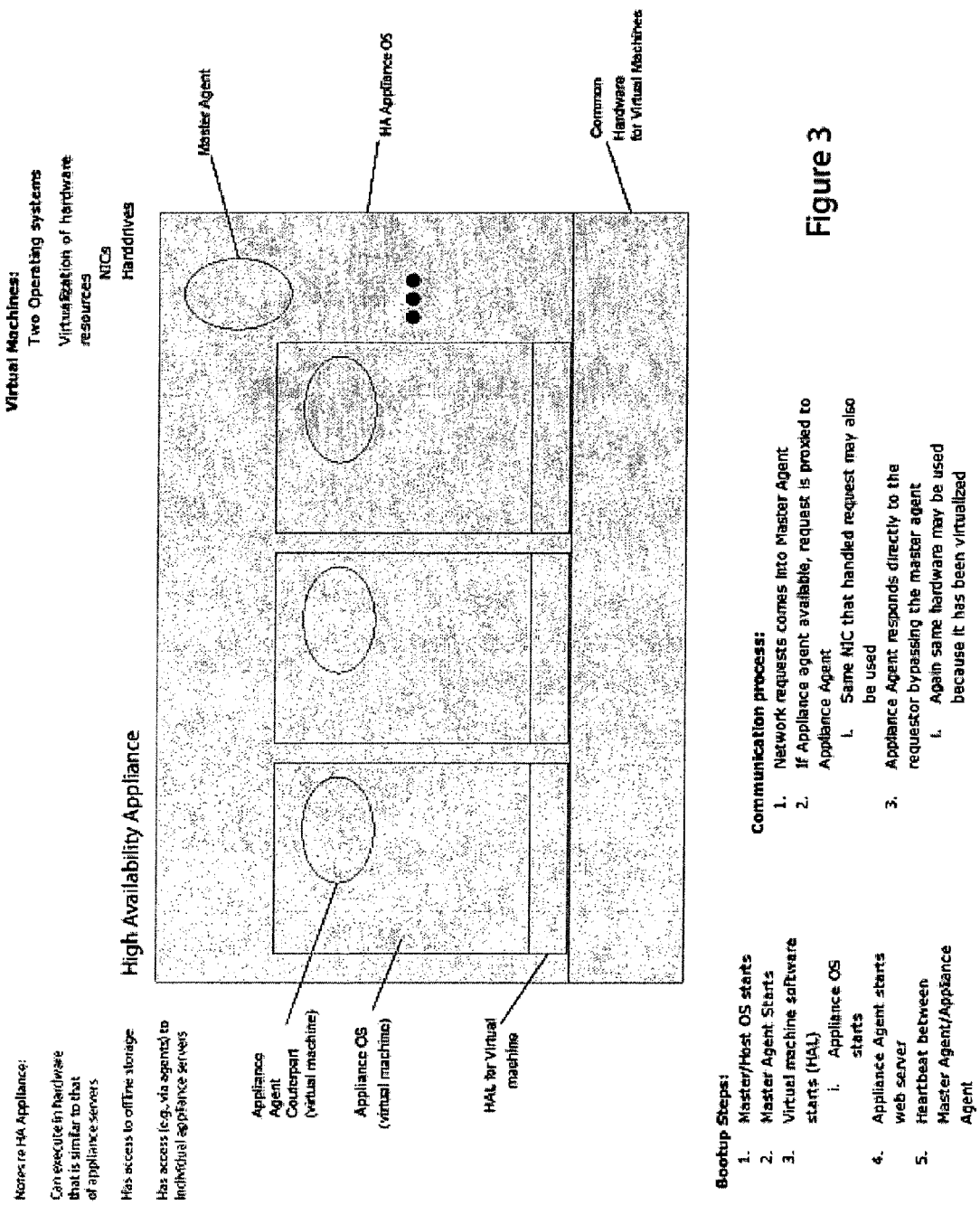
FIG. 3 is another depiction of the HA appliance and provides further notes regarding its operation and communications with the appliance servers.

FIG. 3 is another depiction of the HA appliance and provides further notes regarding its operation and communications with the appliance servers.

FIG. 4 depicts the architecture and interrelationships between the application servers and the HA appliance, and provides further notes regarding same.

Described above are systems, application servers, HA appliances, and methods of operation of same according to the various aspects of the invention. It will be appreciated that the illustrated embodiment is merely an example and that other embodiments incorporating changes therein fall within the scope of the invention, of which we claim:

The invention claimed is:

1. A system for high availability execution of primary applications, comprising
   A. a first set digital data processors, each of which executes one or more primary applications,
   B. a second set of digital data processors, each of which has a plurality of virtual machines which, in turn, each executes an imaged application that comprises an image of a corresponding primary application,
   C. one or more agents, any of executing on or coupled to the digital data processors of the first and second set, the agents maintaining for each imaged application state/configuration information that reflects a substantially current state of the corresponding primary application,
   D. wherein at least one of the imaged applications is (i) maintained in a suspended state within its respective virtual machine and (ii) unsuspended so that said imaged application can be executed by that respective virtual machine from said substantially current state of the corresponding primary application using state/configuration information from a corresponding agent,
   E. wherein at least one imaged application is unsuspended, so that it can be executed by its respective virtual machine, upon failure or other condition of unavailability of the corresponding primary application, and
   F. wherein the unsuspended imaged application is executed in lieu of the corresponding primary application and wherein that imaged application is executed so as to provide a desired degree of throughput, functionality and/or responsiveness.

2. The system of claim 1, wherein the imaged applications are executed through preliminary phases in their respective virtual machines prior to placing the imaged applications in the suspended state or in an idle state.

3. The system of claim 1, wherein resources of the digital data processor in which the virtual machine of the unsuspended imaged application are executed are increased.

4. The system of claim 1, wherein one or more of the agents monitors the primary applications so as to (i) detect failure or other condition of unavailability thereof, and (ii) effect a take over by the corresponding imaged application of the processing performed by such primary application.

5. The system of claim 1, wherein the primary applications comprise any of enterprise-level applications, user applications, operating system tools, or other computer programs.

6. The system of clam 1, wherein the first set comprises a plurality of digital data processors and the second set has a single digital data processor.

7. The system of claim 1, wherein one or more of the agents maintains for the imaged applications state/configuration information that is current as of the last complete transaction processed by the corresponding primary applications.

8. The system of claim 1, wherein one or more of the imaged applications are coupled to storage and/or other peripheral devices to which the corresponding primary applications are coupled.

9. The system of claim 1, wherein one or more of the agents responds to detection of a primary application's at least initiating execution by causing the corresponding imaged application to be loaded into a virtual machine.

10. A method for high availability execution of primary applications, comprising
    A. executing, on each digital data processor of a first set of digital data processors, one or more primary applications
    B. executing, in a respective one of a plurality of virtual machines that themselves execute within each digital data processor of a second set of digital data processors, an imaged application that comprises an image of a corresponding primary application, and
    C. maintaining, with one or more agents that execute on or are coupled to the digital data processors of the first and second sets, for each imaged application state/configuration information that reflects a substantially current state of the corresponding primary application,
    D. maintaining at least one imaged application in a suspended state within its respective virtual machine,
    E. unsuspending the at least one imaged application so that said imaged application can be executed by its respective virtual machine from said substantially current state of the corresponding primary application using state/configuration information from a corresponding agent,
    F. wherein said unsuspending of said at least one imaged application, so that it can be executed by its respective virtual machine, is performed upon failure or other condition of unavailability of the corresponding primary application,
    G. increasing resources of the digital data processor in which the virtual machine of the unsuspended imaged application is executed, and
    H. executing the unsuspended imaged application in lieu of the corresponding primary application so as to provide a desired degree of throughput, functionality and/or responsiveness.

11. The method of claim 10, comprising executing the imaged applications through preliminary phases in their respective virtual machines prior to placing the imaged applications in the suspended state or in an idle state.

12. The method of claim 10, comprising monitoring, with one or more of the agents, the primary applications so as to (i) detect failure or other condition of unavailability thereof, and (ii) effect the take over by the corresponding imaged application of the processing performed by such primary application.

13. The method of claim 10, wherein the primary applications comprise any of enterprise level applications, user applications, operating system tools, or other computer programs.

14. The method of claim 10, wherein the first set comprises a plurality of digital data processors and the second set has a single digital data processor.

15. The method of claim 10, comprising maintaining for the imaged applications, with one or more of the agents, state/configuration information that is current as of the last complete transaction processed by the corresponding primary applications.

16. The method of claim 10, wherein one or more of the imaged applications are coupled to storage and/or other peripheral devices to which the corresponding primary applications are coupled.

17. The method of claim 10, comprising responding, with one or more of the agents, to detection of a primary application's at least initiating execution by causing the corresponding imaged application to be loaded into a virtual machine.

\* \* \* \* \*